(12) United States Patent
Lotens et al.

(10) Patent No.: US 6,633,289 B1
(45) Date of Patent: Oct. 14, 2003

(54) METHOD AND A DEVICE FOR DISPLAYING AT LEAST PART OF THE HUMAN BODY WITH A MODIFIED APPEARANCE THEREOF

(76) Inventors: Wouter Adrie Lotens, Aviank 11, 3769 JK Soesterberg (NL); Markus Camiel Bernardus De Boevere, Steenstraat 75, 5521 KP Eersel (NL); Franciscus Josephus Ricardo Sanders, Hint 4, 5521 AH Eersel (NL); Johanna Jacoba Maria Sanders-Smets, Hint 4, 5521 AH Eersel (NL)

( * ) Notice: Subject to any disclaimer, the term of this patent is extended or adjusted under 35 U.S.C. 154(b) by 0 days.

(21) Appl. No.: 09/530,824

(22) PCT Filed: Oct. 29, 1998

(86) PCT No.: PCT/NL98/00625

§ 371 (c)(1),
(2), (4) Date: Nov. 14, 2000

(87) PCT Pub. No.: WO99/23609

PCT Pub. Date: May 14, 1999

(30) Foreign Application Priority Data

Oct. 30, 1997 (NL) .............................................. 1007397

(51) Int. Cl.[7] .............................................. G06T 17/00
(52) U.S. Cl. ........................ 345/419; 345/629; 345/848; 345/962
(58) Field of Search .................................. 345/419, 420, 345/629–641, 473–475, 706, 719, 723, 764, 769, 848, 961, 962

(56) References Cited

U.S. PATENT DOCUMENTS

| 4,539,585 | A | | 9/1985 | Spackova et al. |
| 4,823,285 | A | * | 4/1989 | Blancato ..................... 364/521 |
| 5,515,268 | A | | 5/1996 | Yoda |
| 5,623,587 | A | | 4/1997 | Bulman |
| 5,850,222 | A | * | 12/1998 | Cone ........................... 345/418 |
| 5,937,081 | A | * | 8/1999 | O'Brill et al. .............. 382/111 |
| 6,307,568 | B1 | * | 10/2001 | Rom ........................... 345/629 |

FOREIGN PATENT DOCUMENTS

| EP | 0 664 527 | 7/1995 |
| EP | 0 725 364 | 8/1996 |
| GB | 2 045 571 | 10/1980 |

* cited by examiner

Primary Examiner—Almis R. Jankus
(74) Attorney, Agent, or Firm—Knobbe, Martens, Olson & Bear, LLP (57) ABSTRACT

A method and a device for displaying at least part of a person's body, for example the head (10), with a modified appearance by providing first image data representatitve of the unmodified appearance of the body part, second image data representatitve of a modification in the appearance of the body part (10) and position data representative of the position and spatial orientation of the body part (10). The first and second image data are linked to produce and to display third image data representative of the modified appearance of the body part, in dependence on the position data, such that the displayed, modified appearance follows changes in the position of the body part in a dynamic manner. For linking the first and second image data a virtual image data space (9) is created comprising an aspect or aspects (12) of the appearance of the body part (10) to be modified. The second image data comprise virtual image data elements (13), and the modification of the appearance of the body part (10) is provided by modifying the virtual image data space (9) using virtual image data elements of the second image data, wherein the virtual image data space thus formed and the first image data not comprised thereof are linked to produce the third image data in dependence on the position data.

35 Claims, 3 Drawing Sheets

METHOD AND A DEVICE FOR DISPLAYING AT LEAST PART OF THE HUMAN BODY WITH A MODIFIED APPEARANCE THEREOF

FIELD OF THE INVENTION

The invention relates to a method and a device for displaying at least part of a person's body with a modified appearance by providing first image data representative of the unmodified appearance of said body part, second image data representative of a modification in the appearance of said body part and position data representative of the position and spatial orientation of said body part, wherein said first and second image data are linked to produce and to display third image data representative of said modified appearance of said body part, in dependence on said position data, such that said displayed modified appearance follows changes in the position of said body part in a dynamic

BACKGROUND OF THE INVENTION

Many clients of hairdressers, beauticians, jewellers, dentists, opticians or boutiques have a need for support and advice in the selection of their purchases-or treatment. A person's imaginative powers continue to play an important role in this respect. Not everybody possesses the same talents in this regard and consequently it is attractive to be more sure of the result in advance by being given an adequate personal visualisation thereof. This applies in particular in those cases where the result cannot be immediately undone, as may for example be the case with a hairstyle. The decision to take a particular treatment and the selection of a particular type of treatment can be made more efficiently when said decisions are supported by such a visualisation, as a result of which the time involved in said treatment can be reduced.

U.S. Pat. No. 4,823,285 discloses a method for representing a person with a modified hairstyle by means of a computer, a television camera and a viewing screen. A static video image of the respective person's head is made, which is displayed on the screen. After a new hairstyle has been selected from a data file, the original hairstyle is substituted on the screen for the selected new hairstyle.

U.S. Pat. No. 5,404,426 discloses a method and a device for visualising hairstyles, using graphic computer techniques. Unlike the presentation of static hairstyles as disclosed in the aforesaid U.S. Pat. No. 4,823,285, a system is disclosed by means of which the hairdo can be modified interactively on the screen. To this end a computing model is used, by means of which modifications in an artificially formed hairstyle resulting from external forces are represented. Said external forces, among which the influence of gravity or the forces resulting from the modelling of a hairdo by means of a comb or the like, can be simulated via a computer mouse or a computer keyboard.

It has become apparent that such a visualisation will only have the intended supporting effect in selecting a purchase or a treatment if said visualisation can appeal to a person's intuitive behaviour, wherein perception plays an important role. Said perception is considerably enhanced by movement.

U.S. Pat. No. 4,539,585 discloses a previewer for the dynamic viewing of article desired to be worn by a user in a complete series of poses without actually trying on the article. In an embodiment, the user creates in real time a series of poses which are time-framed and position orientation coded. The image of the article is computer generated and re-imaged in accordance with the coded position information of the user. The re-imaged article image and the user video image are than video mixed, optically mixed or superimposed in digital image storage memory, such that a composite image may be viewed by the user in a dynamic viewing mode.

Unlike the above-described prior art, this previewer makes it possible to present the modified appearance of a user in a dynamical manner, such that the person in question can evaluate the effect of the modified appearance in several positions thereof. However, because the position coding depends on coded indicia segments, which segments in toto form a composite image of the article, only a limited number of poses can be actually covered.

SUMMARY OF THE INVENTION

U.S. Pat. No. 5,515,268 discloses a previewer essentially of the type disclosed by U.S. Pat. No. 4,539,585, however enhanced with shape sensor means.

Although these known previewers appeal more to a person's intuitive behaviour than the static presentations, in practice, there is a need for a more sophisticated presentation technique such that a modified appearance of at least part of the human body can be displayed in a true-to-life manner, as if the person is looking at himself in a mirror with the modified body part.

Accordingly, it is an object of the invention to provide an improved technique for displaying a body part with a modified appearance, which enables the person in question to evaluate the effect of the modified appearance in a more true-to-life manner.

According to the invention for linking said first and second image data a virtual image data space is created comprising an aspect or aspects of said appearance of said body part to be modified, wherein said second image data comprise virtual image data elements, and wherein said modification of said appearance of said body part is provided by modifying said virtual image data space using virtual image data elements of said second image data, wherein said virtual image data space thus formed and said first image data not comprised thereof are linked to produce said third image data in dependence on said position data.

The term virtual image data space is to be construed in that a real image data space of the first image data representative of the unmodified appearance of the body part and comprising the aspect or aspects of the body part to be modified, is virtually reconstructed. Next, the actual modification is carried out by modifying the virtual image data space using second image data comprised of virtual image data representative of the intended modification. The modified appearance is than created by suitable linking of the modified virtual image data space and the first image data, providing third image data representing the modified appearence of the body part.

The virtual image data space concept according to the invention is essentially able to cope with any changes in the position and spatial orientation of the body part with respect to its environment, such as shading due to differences in the incident light, hiding of portions of the environment due to movement of the body part, etc. This, because the influences of such changes on the appearance to be displayed are virtually constricted in the virtual image data space comprising the modified aspect or aspects of the appearance using respective virtual image data elements.

Unlike the above-described prior art, the invention makes it possible to present the modified appearance in a more dynamical and true-to-life manner, such that the person in question can evaluate the effect of the modified appearance in essentially unrestricted positions thereof. It will be appreciated that such a dynamic, interactive representation is a more efficient support of a person's imagination, as a result of a stronger true-to-life perception. That is, the modified appearance directly follows the changes in the position of the body part in a true-to-life manner, as if the person is looking at it in a front mirror with the body part thus modified.

The method according to the invention provides to select patterns or models in connection with a desired modification, which patterns or models may be selected from a data file, if desired. The actual modified appearance is than created in accordance with the patterns or models selected and composed of virtual image data elements.

Selection of a respective pattern or model may take place in several manners, for example by making a selection from a pattern or model book, whether or not electronically, whereby the appearance of a respective body part is shown commensurately with a respective pattern or model.

The selection of a particular pattern or model may be provided in an efficient manner by first displaying, in accordance with another embodiment of the method according to the invention, the respective part of the person's body in a fixed position with a modified appearance commensurate with a pattern or model to be selected. That is, the body part in question is displayed in a particular position, such as a reference position, with a modified appearance, so that the person in question is given a first indication of the influence of a pattern or model on the respective part of his own body. The patterns or models that have been selected in this manner can then be used for visualisation in a dynamic and true-to-life manner, as described above.

It has furthermore become apparent that the selection of a particular pattern or model can also be supported by displaying further information in combination with the modified appearance, which further information may be visual information or auditive information, or both.

In this connection, further information directly relating to the modified appearance, such as information with regard to care, cost, possible risks and the like may be considered, but for example also information which places the person in question with his modified appearance in a desired situation, a decor, for example, but also clothes and the like. In accordance with one embodiment of the method according to the invention, said further information may be provided in the form of (moving) images, such as a video clip. In this way it is also possible to initiate exchange of information by means of questions and/or answers.

Besides the representation of the modified appearance commensurate with a selected pattern or model, the invention, in a preferred embodiment thereof, furthermore provides a possibility to modify one or more aspects of the modified appearance interactively during said representation. A modification in the colour, the volume, the length and the like can be considered.

The technique according to the invention is not limited to one or more specific parts of a person's body, actually, any desired body modification can be simulated in a manner which optimally matches a person's perception, so as to support said person's selection of a respective modification.

The invention is especially applicable as regards a person's head, wherein the modified appearance comprises modifications in one or more aspects of the hairstyle, the make-up, accessories such as glasses, coloured contact lenses, earrings, piercings and the like, and also modifications of the nose, mouth, lips, teeth, eyes, ears, eyebrows, moustache, beard and other facial features, among which the effect of a facelift or other reconstructive work, for example, wherein for each aspect to be modified a separate virtual image data space is created or wherein aspects to be modified are comprised by a common virtual image data space. The modifications as such, i.e. the hair, nose, etc. are formed from respective virtual image data elements composed of polygons, texture etc., for example.

The first and the second image data can be linked in various manners, according to an embodiment of the method of the invention, for example, this is provided by first arranging the second image data in a relative position commensurate with the first image data. The second image data can be selected from a plurality of pre-stored virtual image data elements in a data file, or be computed by means of suitable mathematical algorithms, on the basis of the position data as address information.

In the case of a selection from pre-stored second image data comprising data recorded from various angles and positions, those image data are selected therefrom during representation that correspond most closely as regards the recording angle or position with the actual angle or position of the respective body part. Next, the image data for the exact angle and position can then be derived by means of an interpolation method. Mathematical techniques for computing such views comprise, inter alia, descriptions including one or more characteristic parameters and polygons.

In a preferred embodiment of the method according to the invention, the virtual image data space is created relative to a generic type of said body part, wherein data representative of the dimensions and geometry of said body part are generated from said first image data, on the basis of which data said generic body type is scaled into commensuration with said dimensions and geometry of said body part according to said first image data.

The advantage of this manner is that the virtual data space can be directly generated from the correct viewing direction, as a result of which it can be adapted relatively easily and fast to the movements of the body part.

In a yet further emobidment of the invention, the second image data are scaled into commensuration with said scaled generic body type, and said virtual image data space is modified by said scaled second image data.

The image data are linked in such a manner that portions of the respective body part which will not be visible in the modified appearance are not shown. For example, assuming that the person in question wears glasses and wishes to see how he looks with a new frame, the data relating to the current glasses of the person in question will have to be removed from the first image data. It should be considered thereby that the person in question will necessarily have to use his glasses in order to be able to view the modified appearance.

Another problem which plays a role in this connection is known as occlusion. When the first and the second image data are being linked, it is taken into account that details of the body part in question, which in reality are hidden behind a selected pattern or model, and which are not visible, therefore, must not be shown in the modified appearance being displayed, either.

On the other hand, a particular modification, for example a different hairstyle, may make it necessary to show parts of a person's face which are not provided by the image data which are representative of the unmodified appearance of that person. In such a case, extrapolation of image data is required by adding respective virtual image data elements. Such as derived from the generic body type.

Both problems can be solved, according to the invention, by making the scaled generic body type data transparant and overlaying same with the third data before display thereof.

In a preferred embodiment of the invention, tracking means are coupled with the body part in question, for example one or more so-called "trackers", which provide position data relating to the position and the spatial orientation (angle) of the body part in question. It will be appreciated that according to the invention said tracking means, insofar as they are visible in the first image data, must not be visible in the third image data being displayed.

In order to provide an optimally true-to-life representation or simulation of the modified appearance, the image data are preferably recorded and displayed as video data with a standard picture frequency of 25 pictures/second or higher.

Unlike the prior art discussed above, the virtual image data according to the invention provides for three-dimensional processing, wherein the modified appearance can be displayed both two-dimensional or three-dimensional. Three-dimensional processing is very advantageous for providing the desired true-to-life visualization according to the present invention.

The invention also provides a device for displaying at least one part of a person's body with a modified appearance thereof as discussed above, which device comprises first means for providing first image data representative of the unmodified appearance of the body part, second means for providing second image data representative of a modification in the appearance of the body part, position determining means for providing position data representative of the position and spatial orientation of the body part, processing means for electronically processing the first and second image data in dependence on the position data, to produce third image data representative of the modified appearance of the body part, and means for displaying the third image data characterized in that the second means are arranged for providing second image data having the form of virtual image data elements, the processing means are arranged for creating a virtual image data space comprising an aspect of the body part to be modified, for adding to the virtual image data space virtual image data elements and for linking the virtual image data space thus formed and the first image data not comprised by the image data space to produce third image data, and for displaying same on the display means.

In a preferred embodiment of the device according to the invention, the recording means comprise at least one fixedly disposed video camera, and the tracking means comprise one or more trackers for determining the position and the spatial orientation of the respective body part relative to the recording means.

It is noted that the video camera may also be movably disposed for the purpose of the invention. Furthermore, several video cameras may be used for recording, and displaying the body part from various angles, if required, in particular for use with three-dimensional processing and relating to the generic type body part disclosed above.

The invention in particular provides a device comprising a semi-transparent mirror, wherein the recording means are disposed on one side of the semi-transparent mirror, whilst the display means are disposed on the other side thereof, in such a manner that the image being displayed by the display means can be viewed from the respective other side of the semi-transparent mirror.

With a device according to the invention which is configured in this manner, the person in question looks in a mirror, as it were, whereby he sees the body part with the modified appearance instead of the actual body part. Let us assume a situation wherein the body part in question is a person's face. In that case the recording means and the display means will be arranged in such a manner with respect to the semitransparent mirror, that said person directly looks in the recording means via the mirror. This creates an illusion of the person in question looking in a real mirror, and all the movements he makes in front of the mirror are directly recorded and processed by the recording means, that is, the video camera(s).

In a preferred embodiment of the device according to the invention, means are provided for storing data comprising one or more patterns or models which are representative of an intended modification in the appearance of a respective body part. The data in question may be video data, that is, data which are directly suitable for being displayed ("bitmap") or data which can be processed into video data, like virtual image data elements.

The storage means may consist of a read-only memory, for example in the form of a smart card, a magnetic card or other information carrier, such as a diskette or the like, which can be coupled to the processing means of the device according to the invention in a manner which is known per se.

In yet another embodiment of the device according to the invention, the storage means may also be disposed at a remote location, whereby the device and the storage means are provided with transmission means for the remote exchange of the respective image data and control data. The transmission means may for example consist of a suitably programmed modem and communication equipment for coupling of the storage means and the device via the public telecommunications network, but also via the Internet, for example. It will be appreciated that this is a highly interesting aspect of the invention, because this makes it possible to continually adapt the applications of the device to the prevailing views on fashion and the like. Furthermore this enables the remote installation of new software in the device.

In an embodiment of the device according to the invention, the storage means are arranged in such a manner that position data and/or image identification or selection data are linked to the image data.

In yet another embodiment of the device according to the invention, modifications in one or more aspects of the modified appearance of a body part being displayed can be made in an interactive manner by input means which are coupled to the processing means. In this connection, the use of a computer mouse, a keyboard, touch screen and the like for modifying the colour, the volume and the like of a modified appearance may be considered. In an advantageous embodiment, this option is controlled intuitively, in such a manner that a user having some experience in the control of computer systems can operate the device himself without constant guidance.

The device according to the invention is furthermore arranged for storing a selected modified appearance by providing a so-called hard copy, for example, by means of a (video) printer or a soft copy on a diskette, a smart card or other information carrier suitable for registering (video) data. Said prints may furthermore include further information, such as commercial information or information on costs, care, etc.

The device according to the invention may furthermore be provided with means for presenting further visual and/or auditive information in combination with or in support of the body part with the modified appearance being displayed a ready explained before.

BRIEF DESCRIPTION OF THE DRAWINGS

The invention will be described in more detail hereafter by means of an exemplary embodiment.

DETAILED DESCRIPTION OF THE INVENTION

In order to provide a good understanding of the invention, a preferred embodiment of the device according to the invention will be described first, which device is in particular suitable for displaying modifications in the appearance connected with the a person's head or face, such as modifications in the hairstyle, make-up, glasses, earrings, etc., or modifications of the nose, mouth, lips, eyes, ears, eyebrows, moustache, beard and the like. It should be understood, however, that the invention is not limited thereto.

Figure 1:
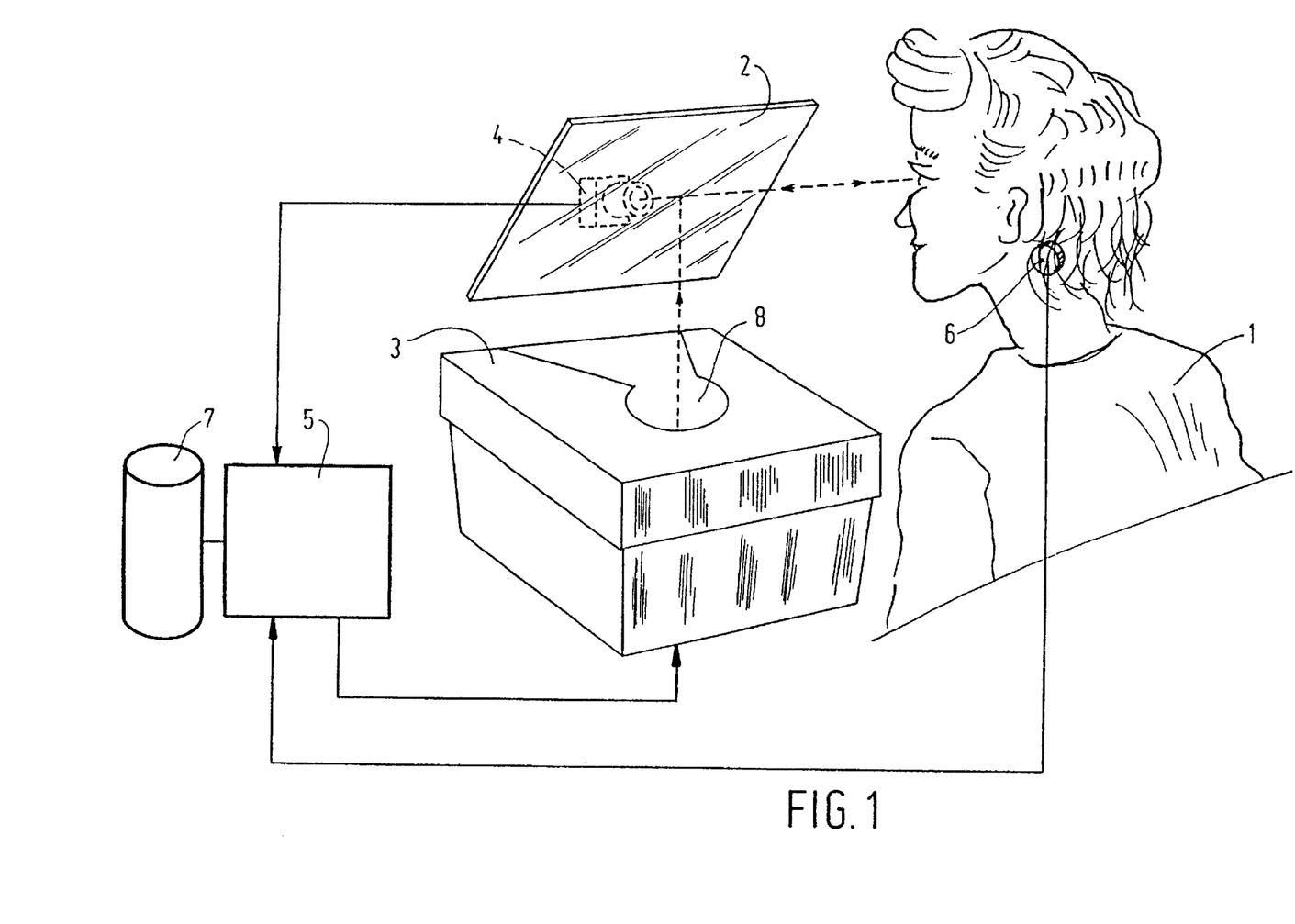
FIG. 1 schematically shows an embodiment of the device according to the invention, comprising a semi-transparent mirror.

Reference numeral 1 in FIG. 1 indicates a person whose head is to be displayed with a modified hairstyle as the new appearance.

In this embodiment, the device according to the invention substantially consists of a semi-transparent mirror 2, which is disposed with one side opposite a two-dimensional or three-dimensional display unit 3, and wherein a video camera 4 is disposed on the other side of the semi-transparent mirror. The semi-transparent mirror 2, the display unit or monitor 3 and the video camera 4 are arranged and aligned in such a manner that the person 1 will look directly at the camera 4 when viewing the representation of his eyes on the display unit 3.

The video camera 4 is connected to an input of a processing unit 5, for example in the form of a computer. An output of the processing unit 5 is coupled to the display unit 3. Tracking means 6 in the form of a so-called "tracker" are attached to the body part to be displayed, that is the head of person 1 in the present example. These tracking means 6 are connected to a further input of the processing unit 5.

The processing unit 5 furthermore connects to storage means 7, for example in the form of a data file or other memory means for storing digital data.

The device according to FIG. 1 may be assembled from commercially available components which are suitable for the purpose of the invention. Processing means 5 are suitably programmed for controlling the components in accordance with the method of the invention. The storage means 7 include virtual image data which are suitable for the purpose of the invention in the form of patterns or models, by means of which the appearance of a body part of person 1 can be modified. The operation of the device is roughly as follows.

First image data delivered by the video camera 4 are supplied to the processing means 5. The image data from the camera 4 may already be available in digital form, or be converted into digital video data by the processing means 5 using a so-called "frame grabber".

For the aspect or aspects of the appearance which have to be modified one or more virtual image data spaces are created. Such that, after modification, these virtual image data spaces substitute part or parts of the person's body to be modified in the first image data. The virtual image data spaces are formed by the processing means 5. In the present example, part of the person's head involved with a modification of the hairstyle are comprised by a virtual image data space.

Second image data from the data file 7, which are representative of a pattern or model for the appearance to be displayed, a new hairstyle in the present example, are used to modify the virtual image data space by the processing means 5 to produce a modified virtual image data space representative of the modified appearance of the body part. The second image data are stored in the storage means 7 in the form of virtual image data elements to be added to the virtual image data space.

Next, the modified virtual image data space is linked or merged with the remainder of the first image data to provide a complete modified appearance. The thus formed third image data may be supplied to the display means in digital form or in analog form, depending on the type being used. It is preferred to use digital data exchange.

The third video data produce an image 8 on the display means 3, which is a combination of the unmodified view of the face of person 1, i.e. real first image data and the modification effected therein by means of the virtual second video data from the storage means 7. The image 8 can be viewed by the person 1 via the semi-transparent mirror 2. The dimensions of the image 8 are thereby such that person 1 perceives what he sees through the semi-transparent mirror 2 as a representation of his own head with the new hairstyle in question.

Movements of the head are transmitted to the processing means 5 via the tracking means 6. On the basis of the position data being delivered, the modified virtual image data space is processed and linked with the first video data from the video camera 4 to produce third video data, such that it seems to person 1 as if he or she is looking at himself or herself in a mirror. By using a video frequency of 25 pictures/second or higher, the movements of the head can be followed dynamically without an objectionable time delay, so that also the modified appearance 8 of the respective body part will be displayed dynamically and in real time for user 1.

In this aspect, the present invention essentially differs from the prior art, which is only capable of displaying dynamics of a respective body part in a limited fashion. The virtual image data space concept of the invention enhances the value of the perception, which makes it possible to take a decision as regards a particular type of treatment and the execution thereof in a more effective manner.

Figure 2:
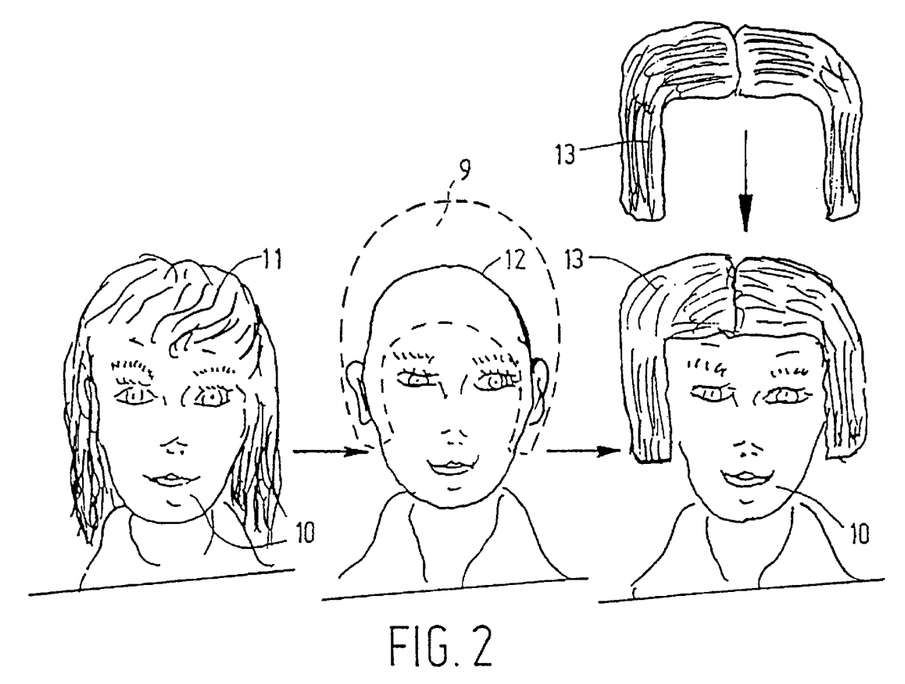
FIG. 2 schematically shows the process of linking video data according to the invention.

FIG. 2 schematically illustrates the linking process of the first image data and the second image data in an embodiment according to the invention.

Reference numeral 10 shows a person's face with real hair 11, i.e. first real image data.

From the first image data, parameters representative of the dimensions and geometry of the body part, i.e. the face 10, are derived by the processing means 5. The dimensions and geometry obtained are used to bring to scale a generic body part type, i.e. a generic face or head 12.

This scaled generic body part 12 is used to create a virtual image data space of the aspect or aspects of the appearance to be modified, i.e. the hairstyle 11. In the figure, a possible virtual image data space is indicated by broken lines 9. Although shown two-dimensionally, virtual image data space 9 preferably is three-dimensional.

Further, the new hairstyle 13, which is a virtual image, is brought to scale using the scaling parameters of the generic body type 12.

The second image data from the storage means 7, which are representative of the hairstyle 13 and selected by a person 1, are added to the virtual data space 9 and linked with the first data of the image 12 to produce third image data, in such a manner that a virtual representation of the face 10 with the new hairstyle 13 is formed, as shown in the right-hand side of FIG. 2.

When the person 1 changes his position relative to the camera 4, for example by inclining or turning his head, etc., said change will be transmitted to the processing means 5 via the tracking means 6. The virtual data space 9 is modified again in accordance with the changed position, as well is the hairstyle 13 corresponding with the respective position-generated, in such a manner that an image 8 corresponding with the changed position of the person 1 is displayed as a result of the linking of the respective data (see FIG. 1).

The second video data, which generally represent a pattern or a model, may be stored in the storage means 7 for a number of discrete positions, whereby the position data delivered by the tracking means 6 may be used as address data for selecting the respective data. An optimum between positions can be found by means of interpolation.

Unlike the retrieving of a respective pattern or model from the storage means 7 on the basis of the position data, the pattern or model data corresponding with a particular position or orientation of the head or another body part may also be computed on the basis of the three-dimensional generic model or pattern. Computing methods which are suitable for this purpose usually comprise a polygon approach of, for example, a hairstyle or other pattern or model with associated parameters.

Unlike the pattern or the model itself, stripped of all non-relevant environmental influences, this may also be stored in a data file in relation to a generic standard type of the respective body part. Based on the first image data of the body part of a person in question, a scaling of the generic, three-dimensional type of body part to fit the body part of the person in question may take place in that case. Then the above-described procedure may be followed again for dynamically displaying the modified appearance in accordance with the momentaneous movements of a person.

The first image data of the person's face and the second image data relating to the hairstyle that has been selected or that is to be selected are aligned in advance by linking the actual position of the person's head once to the read-out of the tracking means 6 (FIG. 1) in a coordinate system to be selected. The person may take up a reference position for said calibration, for example looking straight in the mirror 2, head upright, etc.

According to the invention it is possible in such a reference position to offer a person a first selection possibility for selecting a desired pattern or model for subsequent dynamic visualisation.

When modifying the virtual image data space by the second image data, the fact that details of the pattern or model and of the body part in question will not be visible in practice, because they are visually masked, is taken into account, of course. In an embodiment of the invention, these parts are determined on the basis of a three-dimensional, standard type of the body part. The third image data to be displayed are adapted accordingly in that case. Also in this case it applies that the generic, three-dimensional model of a respective body part is adapted again to the dimensions of the real body part in order to analyse to scale the details that must not be displayed. This analysis is effectively enhanced by providing the generic body type part in a transparant mode. Picture analysis techniques which are known for this purpose are well-known to those skilled in the art. In this connection reference is made inter alia to literature on Z-buffering.

Figure 3:
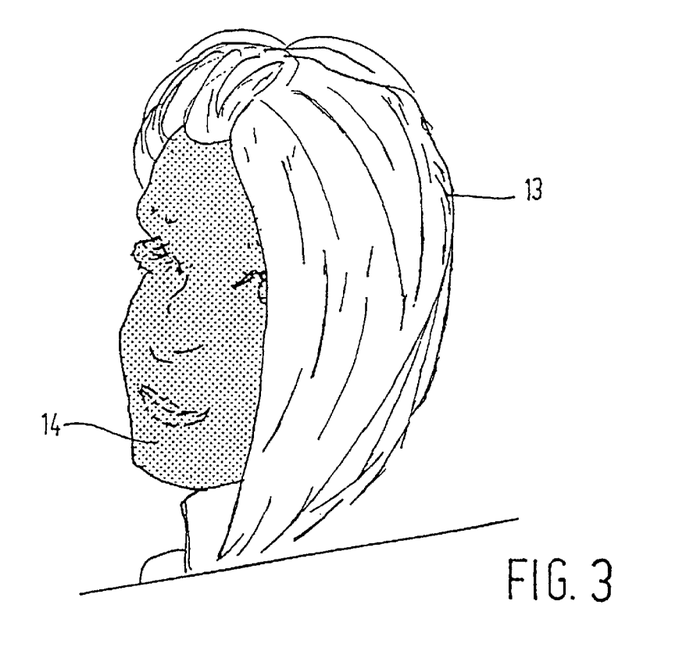
FIG. 3 schematically shows the method according to the invention by means of which portions of a body part which will not be visible are masked in the representation with the modified appearance.

FIG. 3 schematically shows a method for determining which portions must not be displayed, which portions may include the tracking means 6 (FIG. 1), and spectacles, for example, if the modified appearance involves a new spectacle frame.

In FIG. 3, the virtual hairstyle 13 is stripped of the original environment, for example a face and a background. The hatched portion 14 is a transparent generic model of the face, which is used for determining which portions of the eventual face to be displayed must be visible. In the illustrated view, for example, part of the right-hand side of the face (seen from the drawing) is hidden from view by the hair 13. Techniques of this kind are known by the term occlusion in practice.

On the other hand it may be necessary to generate, by extrapolation, portions of for example the face which are not visible in the first image data, because they are shielded by the existing hair, for example, but which must be visible in the third image data.

Besides the dynamic adaptation of the modified appearance on the basis of a person's position and movements, it will be apparent that hair, for example, is not a rigid object, but makes a specific movement of its own under the influence of the person's movements. One embodiment of the invention, in particular intended for displaying hairstyles, distinguishes those parts of the hair that react differently to forces caused by movement, for example by throwing the hair back, by gravity and by movements of the air. The eventual hair movement that results is realised by computing a resulting acceleration from the respective natural movement, the position of the head, movement of the air, gravity and parameters relating to the hair itself. In the last-mentioned case, the difference between long thin hair, long thick hair, short hair, etc. may be considered. All this is done in order to provide a true-to-life simulation.

In the case of a hairstyle, for example, it will be apparent that operations may be carried out thereon, such as a treatment of the hair (structural change) in the form of conditioning, setting, curling, permanent and the like, or a partial or complete colour modification (colour modernisation). According to the invention, this is realised by offering the user a possibility to change one or more aspects of a respective pattern or model in an interactive manner while said pattern or model is being displayed.

One or more so-called modification vectors can be defined for this purpose, which vectors relate to a particular part of a pattern or a model, such as a hairstyle. A suitable selection and/or grouping of modification vectors makes it possible for example to effect a local or a total modification in volume, a local or a total modification in length, a local or a complete modification in colour, etc. It is possible to apply said modifications only to the second video data of the pattern or model, or directly to third video data being displayed, if desired.

Colour modifications can for example be effected by modifying the value of colour parameters from the second image data in a selected part. This means that colours need not become uniform, but that differences in shape will be retained.

Make-up can for example be applied in a comparable manner by selecting colours in a specified area, for example the lips, and modifying said colour. Thus it is possible to modify parts of a face that stand out. In those instances where no parts stand out, or not as an desired (a blush on the cheeks, mouth enlargement), said parts will have to be caused to stand out in the third video data. In order to prevent undesirable modifications of the same colour in other parts of the image being displayed, the area within which the colour modification is allowed to take place can be delimited by means of a suitable marking technique. Only the selected area will be modified as well on the basis of the position data from the tracking means 6 when the body part, the head in this example, is moved.

Accessories such as glasses, earrings, necklaces etc. can be generated from a mathematical description of the shape and the colour related to a three-dimensional standard type of body part. In practice, this technique is known as "Virtual Environment".

Figure 4:
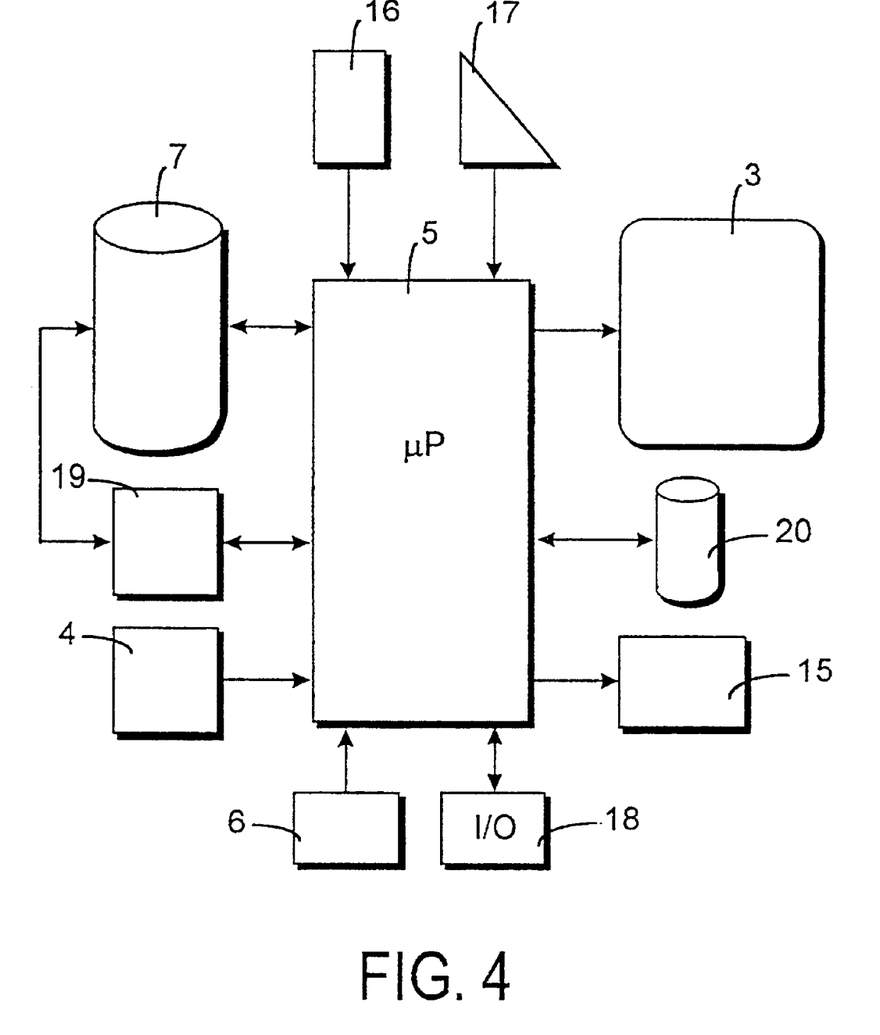
FIG. 4 schematically shows in a block diagram the various electronic components, and the manner in which they are coupled, of which the device according to the invention is built up in an embodiment thereof.

FIG. 4 shows in a block diagram the various electronic components and control means from which the device according to the invention can be assembled.

The heart of the system consists of digital processing means 5, inter alia comprising a microprocessor, memory means for the storage of software, a main memory for interim data storage, a "frame grabber", a graphic card and the required interfaces and connections for data exchange, among which graphic and audiovisual interfaces and the required software.

One or more cameras 4, one or more trackers 6 (tracking means), display means 3 which may be in the form of a viewing screen and loudspeakers, and storage means 7, according to what is desired connect to the processing means 5. Second image data relating to patterns and models may be stored in the storage means 7. Further, if desired, background information and other information to be displayed in combination with a modified appearance may be stored in the storage means 7. Further digital data may be stored instead of image data (bitmap), from which further data the second image data can be generated. Furthermore a printer 15, a computer mouse 16 or other control command element, and a keyboard 17, as desired, will be connected to processing means 5. It is possible to provide a print of a body part with a modified appearance and possibly other information via printer 15, whilst computer mouse 16 and/or keyboard 17 may be used for giving commands for interactively modifying one or more aspects in an image being displayed. To this end the display means may be of the touch screen type. Instead of a printer 15, pictures may be electronically provided and outputted to a user via the Internet, for example.

It is aimed at to make the control of the system as simple as possible, for example by means of a graphic control or a control menu. The storage means 7 may be present at the same location as the device according to the invention, but they may also be present remote therefrom and be connected thereto via a data communication link, for example via the public telephone network or a data network, the Internet or the like. The storage means 7 may also consist of detachable registration means, such as a smart card, a diskette, a CD-ROM etc. All this in order to enable an optimally flexible and simple adaptation of software and patterns and/or models for the purpose of following trends and the like.

The computer-readable storage means 7 provided with second image data or with further digital data from which second image data can be derived, and the manner of addressing and arranging the respective pattern or model data as described above form part of the invention. Instead of or in addition to the storage means 7, a model or pattern generator 19 may be provided for generating second virtual image data. Generic type model or body data may be stored in the storage means or separate storage means 20.

The arrangement shown in FIG. 4 may be built up of components which are available in practice, among which a modern multimedia personal computer having a processing speed of 120 MHz or higher and a working memory of at least 32 Mb. It will be apparent that the accuracy of the modified appearance that is displayed largely depends on the processing capacity of the processing means 5 in question. It is noted that it is not accuracy which is the main objective of the present invention, but rather the perception, in order to appeal maximally to a person's imagination.

"Trackers" which are suitable for the purpose of the invention are commercially available, and they may for example operate according to the electromagnetic, the acoustic or the infrared principle.

The user can operate the device according to the invention himself, without requiring a great deal of experience. After a respective body part has been prepared, which may be necessary, for example hair being tied tightly backwards, in such a manner that it is possible to show as much as possible of the person's face, the tracking means 6 are attached. This may for example be done by means of a clip behind the ear. Then the person takes up a prescribed position in front of the camera 4 for the purpose of calibrating the tracking means. After a number of parameters which may be of relevance for the possible selections, for example the density of the person's own hair, the length, the colour and other preferences have been input, displaying may be started at once, or a selection from an electronic catalogue of patterns or models may be made first. According to the invention, models from said catalogue can directly be shown on a representation of the person's face. Once the selection has been made, displaying is started.

In order to enhance the perception, the side or the back of the head or another body part may be displayed on the display means 3 in one or more windows thereof. Two or more video cameras may be used for this purpose. The images in the windows can be displayed so that they can be easily viewed by said person.

The environment in which the persons sees himself is also of great importance for the perception. Consequently, a recording room may be provided, which comprises suitable lighting, background, sound and other elements which determine the atmosphere, and which can be adjusted in dependence of a respective selected model or pattern. In the case of a hairdresser's salon, for example, the recording room may be a separate room or it may be integrated in the salon itself.

Fixed video cameras are preferred in order to keep the construction simple, the invention is not limited thereto, however.

Besides the processing means 5, input/output (I/O) means 18 are furthermore provided for external control of for example elements which determine the atmosphere in the recording room, but also for relaying a recording to one or more remote display means 3, in such a manner that others can also view the recording. Said relaying may take place in a well-known manner, both via cables or by wireless means.

For statistical and historical purposes, a user log file may be automatically created and analyzed by suitable software.

Although the invention has been illustrated in particular by means of an application for representing a person's face with a modified hairstyle in the foregoing, it stands to reason that the invention and its uses are not limited thereto.

What is claimed is:

1. A method of displaying at least one part of a person's body with a modified appearance, comprising:

providing first image data representative of an unmodified appearance of a body part;

providing second image data representative of a modification in the appearance of said body part;

providing position data representative of a position and spatial orientation of said body part;

creating a virtual image data space for linking said first and second image data, the virtual image data space comprising an aspect of said appearance of said body part to be modified, wherein said second image data comprise virtual image data elements, and wherein said modification of said appearance of said body part is provided by modifying said virtual image data space using virtual image data elements of said second image data; and linking said virtual image data space thus formed and said first image data not comprised thereof to produce and to display third image data in dependence of said position data, wherein the third image data is representative of said modified appearance of said body part such that said third image data is produced according to the position of said body part to thereby allow said displayed modified appearance to follow variations in the position of said body part in a dynamic manner.

2. The method of claim 1, further comprising modifying the appearance of a respective body part commensurately with a preselected pattern or model composed of virtual image data elements.

3. The method of claim 2, further comprising selecting a respective pattern or model from a file of patterns or models.

4. The method of claim 2, further comprising displaying said body part with a modified appearance commensurate with a pattern or model in a reference position, in order to select a respective pattern or model.

5. The method of claim 1, further comprising modifying the appearance of said body part interactively in one or more aspects during display thereof.

6. The method of claim 1, further comprising displaying the modified appearance in combination with or supported by further visual or auditive information.

7. The method of claim 6, further comprising displaying data relating to the modified appearance as further information.

8. The method of claim 6, further comprising displaying moving images in the form of a video clip as further information.

9. The method of claim 6, wherein said further information comprises further image data having the form of further virtual image data elements which are added to a virtual image data space.

10. The method of claim 1, wherein said body part is a person's head, and the modified appearance comprises modifications in one or more aspects of hairstyle, hair jewels, hats, makeup, accessories in the form of glasses, colored contact lenses, earrings, piercings, and facial modifications in facial features includes nose, mouth, lips, teeth, eyes, ears, eyebrows, moustache, beard, facelift and reconstructive work, wherein for each aspect to be modified in a separate virtual image data space is created or wherein aspects to be modified are comprised by a common virtual image data space.

11. The method of claim 1, further comprising selecting and computing said second image data in dependence of said position data from virtual image data elements pre-stored in a data file.

12. The method of claim 1, wherein said first and second image data are linked in such a manner that portions of said body part which will not be visible in the modified appearance are not shown, and that portions of said body part that will be visible are shown, by means of extrapolation by adding to a respective virtual image data space respective virtual image data elements.

13. The method of claim 12, further comprising scaling said second image data into commensuration with said scaled generic body type, and modifying said virtual image data space by said scaled second image data.

14. The method of claim 1, wherein said virtual image data space is created relative to a generic type of said body part, wherein data representative of the dimensions and geometry of said body part are generated from said first image data, on the basis of which data said generic body type is scaled into commensuration with said dimensions and geometry of said body part of said first image data.

15. The method of claim 14, further comprising substituting one or more portions of said first image data by image data derived from said scaled generic type of said body part.

16. The method of claim 1, further comprising interactively modifying one or more aspects of said displayed modified appearance during display by modifying said second image data or said third image data.

17. The method of claim 1, wherein tracking means are coupled with said body part, and said body part is placed or held in a reference for calibration purposes.

18. The method of claim 1, wherein said image data and said image data elements inclusive said virtual image data space and a generic body part type are three-dimensional digital representations.

19. The method of claim 1, wherein said image data are provided and displayed as video data with a standard picture frequency of preferably 25 pictures/second or higher.

20. A device for displaying at least a part of a person's body with a modified appearance, comprising:

first means for providing first image data representative of an unmodified appearance of said body part;

second means for providing second image data representative of a modification in the appearance of said body part, said second means are arranged for providing second image data having the form of virtual image data elements;

position determining means for providing position data representative of the position and spatial orientation of said body part;

processing means for electronically processing said first and second image data in dependence on said position data, to produce third image data representative of said modified appearance of said body part, said processing means are arranged for creating a virtual image data space comprising an aspect of said body part to be modified, for adding to said virtual image data space virtual image data elements and for linking said virtual image data space thus formed and said first image data not comprised by said image data space to produce third image data representative of said position and spatial orientation of said body part to thereby allow said displayed modified appearance to follow variations in said position and spatial orientation of said body part in a dynamic manner; and means for displaying said third image data produced by the processing means.

21. The device of claim 20, wherein said first means comprise recording means having at least one fixedly disposed video camera, and wherein said tracking means comprise one or more trackers for determining the position and the spatial orientation of said body part relative to said recording means.

22. The device of claim 21, further comprising a semi-transparent mirror, wherein said recording means are disposed on one side of said semi-transparent mirror, while said display means are disposed on its other side, in such a manner that said image displayed by the display means can be viewed from the said other side of said semi-transparent mirror as if said person is looking at said body part with its modified appearance in front of a mirror.

23. The device of claim 20, wherein said second means comprise storage means for storing second image data comprising one or more patterns or models composed of virtual image data elements representative of an intended modification in the appearance of a respective body part or further image data and control data.

24. The device of claim 23, wherein said storage means comprise a read-only memory in the form of a smart card, a magnetic card or another information carrier for storing information in digital form thereon.

25. The device of claim 23, wherein said storage means are disposed at a location remote from said device, said device and said storage means having transmission means for remote exchange of second image data or further image data and control data.

26. The device of claim 23, wherein said second image data or said further image data in said storage means are linked to position data.

27. The device of claim 23, wherein said second image data or said further image data in said storage means are linked to data identifying a particular pattern or model of said image data.

28. The device of claim 20, wherein said first and second means and said processing means are arranged for recording, storing and processing of three-dimensional digital image data.

29. The device of claim 20, further comprising input means which are coupled to said processing means configured for interactively changing one or more aspects of the modified appearance of said body part while it is being displayed.

30. The device of claim 20, further comprising output means coupled to said processing means.

31. The device of claim 30, wherein the output means include a printer for providing at least a print of said body part with its modified appearance.

32. The device of claim 20, further comprising means for presenting further visual or auditive information in combination with or in support of said display of said body part with its modified appearance.

33. A computer-readable storage medium, comprising:

virtual image data elements representing a predetermined image of a body part including positional and spatial orientation of said body part;

additional data, said virtual image data elements and said additional data forming image data representative of the body part including said positional and spatial orientation of said body part; and a program configured to modify the appearance of said body part by modifying said virtual image elements of said image data including said positional and spatial orientation of said body part to thereby allow said modified appearance to follow variations in the positional orientation of said body part in a dynamic manner.

34. The storage medium of claim 33, further comprising position data associated with said image data.

35. The storage medium of claim 33, wherein said additional data comprises data identifying a particular pattern or model of said image data.

\* \* \* \* \*